United States Patent
Panda et al.

(10) Patent No.: US 10,929,232 B2
(45) Date of Patent: Feb. 23, 2021

(54) DELAYED ERROR PROCESSING

(71) Applicant: Intel Corporation, Santa Clara, CA (US)

(72) Inventors: Subhankar Panda, Portland, OR (US); Sarathy Jayakumar, Portland, OR (US); Gaurav Porwal, Bangalore (IN); Theodros Yigzaw, Sherwood, OR (US)

(73) Assignee: Intel Corporation, Santa Clara, CA (US)

( * ) Notice: Subject to any disclaimer, the term of this patent is extended or adjusted under 35 U.S.C. 154(b) by 754 days.

(21) Appl. No.: 15/610,067

(22) Filed: May 31, 2017

(65) Prior Publication Data

US 2018/0349231 A1    Dec. 6, 2018

(51) Int. Cl.
| | |
|---|---|
| *G06F 11/00* | (2006.01) |
| *G06F 11/14* | (2006.01) |
| *G06F 11/07* | (2006.01) |
| *G06F 11/20* | (2006.01) |

(52) U.S. Cl.
CPC ...... *G06F 11/1438* (2013.01); *G06F 11/0712* (2013.01); *G06F 11/0793* (2013.01); *G06F 11/2023* (2013.01); *G06F 11/0757* (2013.01); *G06F 11/0772* (2013.01); *G06F 11/1441* (2013.01); *G06F 11/202* (2013.01); *G06F 2201/815* (2013.01)

(58) Field of Classification Search
CPC ............ G06F 11/1484; G06F 11/1438; G06F 11/0712; G06F 11/0793
See application file for complete search history.

(56) References Cited

U.S. PATENT DOCUMENTS

| | | | | |
|---|---|---|---|---|
| 9,344,494 | B2* | 5/2016 | Mordani | H04L 69/40 |
| 9,692,666 | B2* | 6/2017 | Salokanto | H04L 41/5054 |
| 9,699,509 | B2* | 7/2017 | Tago | G06F 9/4843 |
| 9,934,095 | B2* | 4/2018 | Kim | G06F 11/1484 |
| 10,558,536 | B2* | 2/2020 | Ngo | G06F 9/45558 |
| 10,678,617 | B2* | 6/2020 | Folco | G06F 11/07 |
| 2004/0230861 | A1 | 11/2004 | Bailey et al. | |
| 2009/0117889 | A1 | 5/2009 | Varanda | |
| 2009/0144579 | A1* | 6/2009 | Swanson | G06F 11/0712 714/3 |
| 2009/0307538 | A1 | 12/2009 | Hernandez et al. | |
| 2014/0181359 | A1 | 6/2014 | Zhang et al. | |
| 2014/0223226 | A1* | 8/2014 | Yigzaw | G06F 11/1064 714/15 |
| 2014/0298091 | A1* | 10/2014 | Carlen | G06F 9/54 714/15 |
| 2017/0060707 | A1* | 3/2017 | Harper | G06F 11/2025 |
| 2018/0349231 | A1* | 12/2018 | Panda | G06F 11/1438 |
| 2019/0102265 | A1* | 4/2019 | Ngo | G06F 11/302 |
| 2019/0129775 | A1* | 5/2019 | Folco | G06F 9/5077 |

* cited by examiner

*Primary Examiner* — Jonathan D Gibson
(74) *Attorney, Agent, or Firm* — Patent Capital Group

(57) ABSTRACT

A computing apparatus, including: a hardware platform including a processor and memory; and a system management interrupt (SMI) handler; first logic configured to provide a first container and a second container via the hardware platform; and second logic configured to: detect an uncorrectable error in the first container; responsive to the detecting, generate a degraded system state; provide a degraded state message to the SMI handler; instruct the second container to seek a recoverable state; determine that the second container has entered a recoverable state; and initiate a recovery operation.

25 Claims, 7 Drawing Sheets

DELAYED ERROR PROCESSING

FIELD OF THE SPECIFICATION

This disclosure relates in general to the field of cloud computing, and more particularly, though not exclusively to, a system and method for delayed error processing.

BACKGROUND

Contemporary computing practice has moved away from hardware-specific computing and toward "the network is the device." A contemporary network may include a data center hosting a large number of generic hardware server devices, contained in a server rack for example, and controlled by a hypervisor. Each hardware device may run one or more instances of a virtual device, such as a workload server or virtual desktop.

BRIEF DESCRIPTION OF THE DRAWINGS

The present disclosure is best understood from the following detailed description when read with the accompanying figures. It is emphasized that, in accordance with the standard practice in the industry, various features are not necessarily drawn to scale, and are used for illustration purposes only. Where a scale is shown, explicitly or implicitly, it provides only one illustrative example. In other embodiments, the dimensions of the various features may be arbitrarily increased or reduced for clarity of discussion.

EMBODIMENTS OF THE DISCLOSURE

Figure 1:
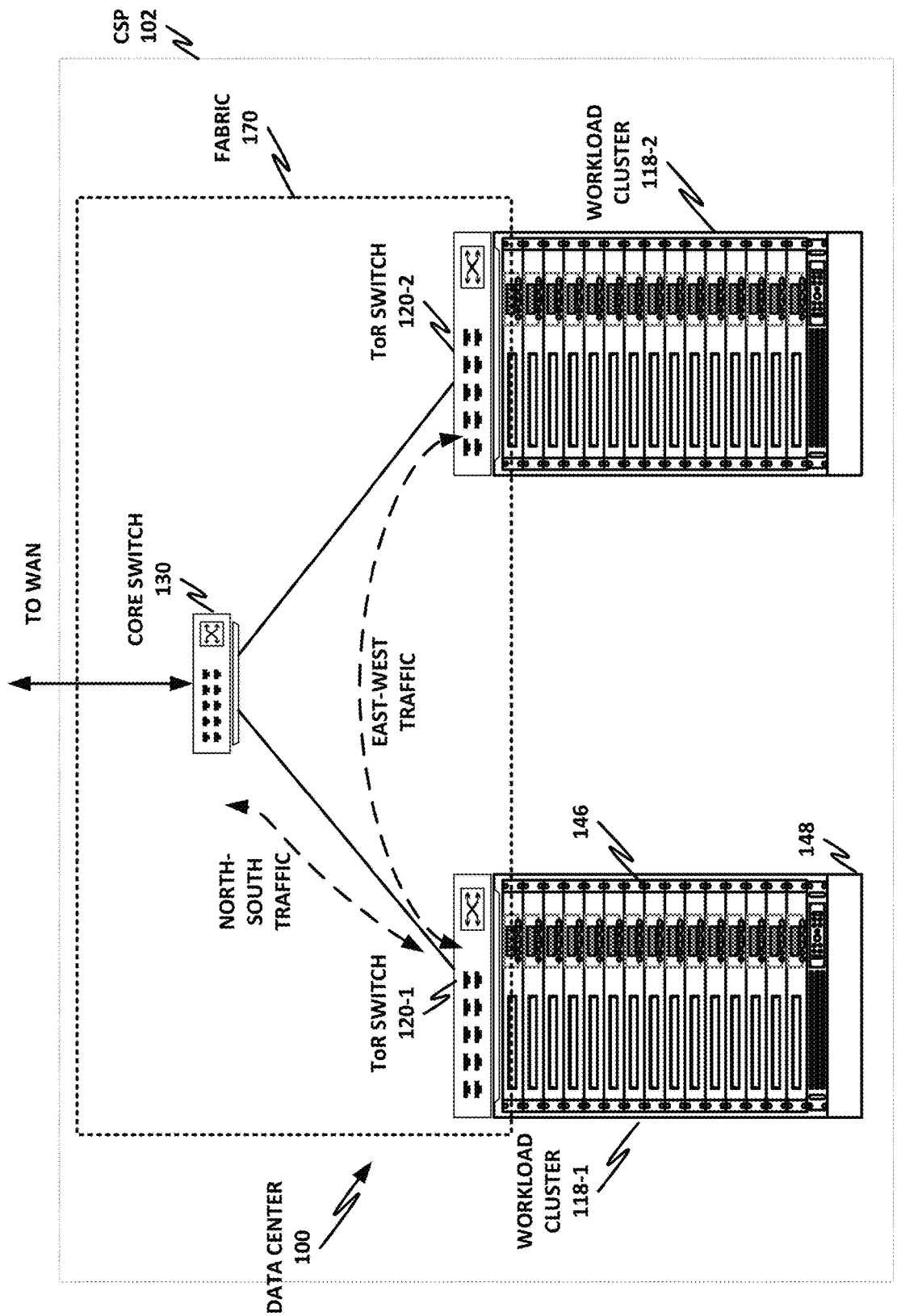
FIG. 1 is a network-level diagram of a cloud service provider (CSP), according to one or more examples of the present specification.

The following disclosure provides many different embodiments, or examples, for implementing different features of the present disclosure. Specific examples of components and arrangements are described below to simplify the present disclosure. These are, of course, merely examples and are not intended to be limiting. Further, the present disclosure may repeat reference numerals and/or letters in the various examples. This repetition is for the purpose of simplicity and clarity and does not in itself dictate a relationship between the various embodiments and/or configurations discussed. Different embodiments may have different advantages, and no particular advantage is necessarily required of any embodiment.

In a contemporary data center, very high compute densities may be realized. For example, a collection of highly capable compute platforms may be aggregated into a blade chassis or a compute sled, and that chassis may then consume one or more slots in a rack chassis. A rack with several high-density compute nodes of this type may thus host tens or hundreds of cores in a single rack with, for example, a 42 U or similar capacity.

Software engineering techniques may target each core in such an architecture to run a single thread in a multithreaded process. A single application may have a plurality of threads, and thus may consume a plurality of processor cores. One or more additional cores may also be dedicated to providing an operating system and/or other support software.

In some cases, to save the overhead of providing a separate operating system for each discrete application, while also maintaining some logical separation between applications, a single operating system may run a number of "containers." The containers may share low-level operating system resources, but may otherwise be isolated from one another.

This architecture provides for the provisioning of compute, storage, communication, and acceleration resources that can be provided in a data center connected via a fabric.

An advantage of containers as described above is that they provide a modular and flexible rack scale implementation for infrastructure as a service (IaaS), platform as a service (PaaS), and software as a service (SaaS).

One challenge in such a multi-containerized system is that a single uncorrectable error in one container can cause a failure of the hierarchical structures and in some cases may bring down the underlying operating system, thus causing data loss across other containers. This can be particularly challenging in a case where a lower priority container may encounter an error and may thus cause the failure of a higher priority container. The situation can be aggravated in some examples because the lower priority container may have a less robust programming model, whereas the higher priority container may be more "ruggedized" and more robust. Thus, the less robust lower priority container can cause unintended interactions with a more robust higher priority container.

For example, one implementation may include one container providing an email server and another container providing a high-availability database server. If the low priority email server encounters an uncorrectable error such as a corrupted memory location, then the operating system error handling routine may require a clean restart to ensure memory integrity. Unfortunately, not only will this clean restart affect the low priority email server, but will also affect the high priority, high-availability database server. Furthermore, if the failure occurs while the database server is performing a critical operation such as a database write operation, the failure could in fact lead to corruption of one or more records in the database itself.

While this issue may be partially avoided by a providing only homogeneous containers on a single operating system (such as only providing database servers with other database servers in a single operating system), this strategy can affect the advantages of containerized computing. Furthermore, such errors cannot be completely avoided, because even highly robust applications may encounter errors. Thus, if a plurality of containers are each running a highly robust database server, if one of those database servers encounters an uncorrectable error, it will bring all of them down.

Examples of such uncorrectable errors include errors in the memory subsystem RAS stack (hardware, firmware, and/or software). Attempts to recover from such an uncorrectable error may include enhanced MCA generation to based firmware models.

It is thus advantageous to provide a system that can more gracefully recover from uncorrectable errors. In particular, rather than immediately going to an error handler routine when an application running in a single container encounters an uncorrectable error, delayed error handling can be implemented instead. This delayed error handling is practicable because although the containers may share underlying operating system services, they generally do not share memory pages or other resources. Thus, the fact that a memory page may be corrupt or inaccessible for one container should not affect another container. Thus, rather than immediately going to a catastrophic error recovery, which can bring down the other containers and cause data loss, a delayed error handling can be implemented. With a delayed error handling, the other containers can be notified to seek a "recoverable state" or otherwise prepare for error handling. A "recoverable state" as used throughout this specification is a state in which the node's workload is completed, minimized, or reduced, and thus danger of data loss or data corruption is also eliminated, minimized, or reduced. The recoverable state may be a relatively quiescent state compared to the container's active state. For example, if the container is a database driver, the recoverable state may be one in which it is no longer accepting new incoming database connections, and all pending operations have been completed and committed. In the case of a web server, a recoverable state could be one in which it is no longer accepting incoming HTTP connections, and all pending transactions have been reasonably handled. In the case of a compute node (e.g., for a large parallel computation), a recoverable state may be one in which it is no longer accepting incoming computational transactions, and has completed and written out existing transactions. In yet another example, the recoverable state may include a state wherein the container can be migrated to a new hardware platform with minimal data loss, in which case the container may be migrated before error recovery occurs.

While error recovery is deferred, the container that encountered the error may itself be stalled. Because it has encountered an uncorrectable error, it may not be able to proceed with computing or processing. However, in a flexible data center employing software defined networking and network function virtualization, it is often practical to spawn new instances of that service to handle any additional workload that is lost from the loss of the one instance in the failed container.

Note that "seeking" a recoverable state, as disclosed herein, need not require the "degraded" (but not stalled) container to immediately cease accepting incoming transactions. To avoid disruption of data center services, the degraded container may continue accepting new incoming connections or transactions while the data center is under higher loads, and may wait until the load has tapered off to stop accepting new incoming connections or transactions. But because the stalled container is consuming resources that cannot be allocated elsewhere, error processing may not be deferred indefinitely. The instruction to seek a recoverable state may include a timeout. If the container does not reach its optimal recoverable state before the timeout expires, the error handling may be processed anyway so that resources consumed by the stalled node can be brought back into circulation on the data center.

The ultimate response to an uncorrectable error may depend on system capabilities. For example, the response could include a shutdown and restart or error recovery. In some cases, where error recovery is disabled or not available, the response may generally be a shutdown of the compute resource, followed by error harvesting, and then a restart. While such error recovery appears transparent from the perspective of the operating system, it can in fact have serious performance impacts on currently executing containers. This is because, for recovery, several hardware subunits may have to be reprogrammed and recovered from and transactions restarted in some cases. This means that the pre-error state may be lost and may have to be rebuilt by software re-execution. Furthermore, sometimes the advanced recovery routines are very complex and may require several system management routines to complete. For example, mirroring failover may require all system address maps to be updated to reflect the failed memory as a primary memory, which may take a nontrivial amount of time.

In yet another example, memory sparing is used, in which an engine copies all previously held data in master records to the slave and then marks the slave as the master. Again, this may require several iterative SMI flows to complete, whether the system has recovered or not. In any case, whether the operating system considers an error nonrecoverable or recoverable, other tasks such as apps or containers may see either a data loss or performance loss, or both.

Thus, it is advantageous to provide a delayed error recovery mechanism that waits to attempt error recovery until other apps or containers are at a more suitable (recoverable) state such that they will not lose data.

In an embodiment, the system may have an interface for receiving instructions on error recovery options, such as from a user or orchestrator. For example, a system administrator may operate a user interface to the orchestrator in which she defines a policy for error recovery, including error recovery actions to take, the maximum timeout for certain types of containers, parameters for how a container may seek a recoverable state upon receiving a degradation notice, and how the orchestrator may help, such as by directing traffic away from the degraded container and/or spawning a new instance of the service provided by the stalled container (either autonomously, or on a request from the hardware platform hosting the stalled container).

Embodiments of the present specification support recovery from critical errors such as memory errors and cache errors. Supported error types may include, by way of non-limiting example, error-correcting code (ECC) memory, PCIe data errors, and other examples of "poison" data. In some embodiments, a distinction may be made between delayable errors, and others that should not be delayed, such as parity errors on buffers. Thus, certain embodiments of the present specification identify such errors and recover them immediately regardless of the delayed error mechanism.

Error containment may also be a consideration of embodiments of the present specification. It may be desirable to ensure that in the case of a data error, other data are not corrupted. Thus, data isolation may be used. This may include blocking write-backs from corrupted memory I/O, such as a hard drive or other external data source.

While delayed error recovery is pending, other apps and containers may gracefully continue operating until they reach a good "stopping point." This may include permitting other containers to complete program execution, or continue program execution for a reasonable time. Some embodiments may notify a scheduler not to schedule more tasks until the error is handled. Thus, not only is the container permitted to keep running, but measures may be taken to ensure that additional workloads are removed from it so that it can reach a recoverable state.

In certain embodiments, a timeout may also be specified for cases in which a container runs longer than is desired for the system. In other words, a nonaffected container may be requested to start reducing workload and reach a recoverable state. This may be issued by the operating system or firmware. Once the request is issued, the operating system or firmware may set a timeout, after which timeout, if the container has not notified that it has reached a graceful recovery state, it may be forcefully closed or shut down. This may be similar to a maintenance mode shutdown request. Thus, while the application is given an opportunity to reach a recoverable state, it is not given unlimited time to do so, as that may affect the ability of the ultimate error recovery to occur.

The operating system is also given the capability to suspend offending applications, so that no further data from the application may be used. Thus, an operating system scheduler has the capability to ensure that there were no more invocations of the offending application. The state of the offending application may be kept available for later debug and referencing.

In certain embodiments, the system agent firmware may also notify a system administrator or other administrative task that the system is running in a degraded mode. This could take the form, for example, issuing a notification to the data center orchestrator. This may ensure that the data center orchestrator starts directing flows away from the offending platform so that it can reach a recoverable state. For example, the orchestrator may instruct a load balancer not to assign the degraded container to any new load-balancing buckets, and may also instruct the load balancer to gradually redirect buckets from the degraded container to other containers. This may allow the degraded container to gradually draw down so that it can reach a recoverable state.

Advantageously, delayed error processing allows other containers to avoid data loss or data corruption when critical errors in another container are encountered related to memory and other data paths and subsystems. Embodiments may also create an architectural dump of the defaulting app or container, which can then be replayed in recovery mode or software to allow for possible failure analysis and later debug.

A system and method for delayed error processing will now be described with more particular reference to the attached FIGURES. It should be noted that throughout the FIGURES, certain reference numerals may be repeated to indicate that a particular device or block is wholly or substantially consistent across the FIGURES. This is not, however, intended to imply any particular relationship between the various embodiments disclosed. In certain examples, a genus of elements may be referred to by a particular reference numeral ("widget 10"), while individual species or examples of the genus may be referred to by a hyphenated numeral ("first specific widget 10-1" and "second specific widget 10-2").

FIG. 1 is a network-level diagram of a network 100 of a cloud service provider (CSP) 102, according to one or more examples of the present specification. CSP 102 may be, by way of nonlimiting example, a traditional enterprise data center, an enterprise "private cloud," or a "public cloud," providing services such as infrastructure as a service (IaaS), platform as a service (PaaS), or software as a service (SaaS).

CSP 102 may provision some number of workload clusters 118, which may be clusters of individual servers, blade servers, rackmount servers, or any other suitable server topology. In this illustrative example, two workload clusters, 118-1 and 118-2 are shown, each providing rackmount servers 146 in a chassis 148.

Each server 146 may host a standalone operating system and provide a server function, or servers may be virtualized, in which case they may be under the control of a virtual machine manager (VMM), hypervisor, and/or orchestrator, and may host one or more virtual machines, virtual servers, or virtual appliances. These server racks may be collocated in a single data center, or may be located in different geographic data centers. Depending on the contractual agreements, some servers 146 may be specifically dedicated to certain enterprise clients or tenants, while others may be shared.

The various devices in a data center may be connected to each other via a switching fabric 170, which may include one or more high speed routing and/or switching devices. Switching fabric 170 may provide both "north-south" traffic (e.g., traffic to and from the wide area network (WAN), such as the internet), and "east-west" traffic (e.g., traffic across the data center). Historically, north-south traffic accounted for the bulk of network traffic, but as web services become more complex and distributed, the volume of east-west traffic has risen. In many data centers, east-west traffic now accounts for the majority of traffic.

Furthermore, as the capability of each server 146 increases, traffic volume may further increase. For example, each server 146 may provide multiple processor slots, with each slot accommodating a processor having four to eight cores, along with sufficient memory for the cores. Thus, each server may host a number of VMs, each generating its own traffic.

To accommodate the large volume of a traffic in a data center, a highly capable switching fabric 170 may be provided. Switching fabric 170 is illustrated in this example as a "flat" network, wherein each server 146 may have a direct connection to a top-of-rack (ToR) switch 120 (e.g., a "star" configuration), and each ToR switch 120 may couple to a core switch 130. This two-tier flat network architecture is shown only as an illustrative example. In other examples, other architectures may be used, such as three-tier star or leaf-spine (also called "fat tree" topologies) based on the "Clos" architecture, hub-and-spoke topologies, mesh topologies, ring topologies, or 3-D mesh topologies, by way of nonlimiting example.

The fabric itself may be provided by any suitable interconnect. For example, each server 146 may include a fabric interface, such as an Intel® Host Fabric Interface (HFI), a network interface card (NIC), or other host interface. The host interface itself may couple to one or more processors via an interconnect or bus, such as PCI, PCIe, or similar, and in some cases, this interconnect bus may be considered to be part of fabric 170.

The interconnect technology may be provided by a single interconnect or a hybrid interconnect, such where PCIe provides on-chip communication, 1 Gb or 10 Gb copper Ethernet provides relatively short connections to a ToR switch 120, and optical cabling provides relatively longer connections to core switch 130. Interconnect technologies include, by way of nonlimiting example, Intel® OmniPath™, TrueScale™, Ultra Path Interconnect (UPI) (formerly called QPI or KTI), STL, FibreChannel, Ethernet, FibreChannel over Ethernet (FCoE), InfiniBand, PCI, PCIe, or fiber optics, to name just a few. Some of these will be more suitable for certain deployments or functions than others, and selecting an appropriate fabric for the instant application is an exercise of ordinary skill.

Note however that while high-end fabrics such as OmniPath™ are provided herein by way of illustration, more generally, fabric 170 may be any suitable interconnect or bus for the particular application. This could, in some cases, include legacy interconnects like local area networks (LANs), token ring networks, synchronous optical networks (SONET), asynchronous transfer mode (ATM) networks, wireless networks such as WiFi and Bluetooth, "plain old telephone system" (POTS) interconnects, or similar. It is also expressly anticipated that in the future, new network technologies will arise to supplement or replace some of those listed here, and any such future network topologies and technologies can be or form a part of fabric 170.

In certain embodiments, fabric 170 may provide communication services on various "layers," as originally outlined in the OSI seven-layer network model. In contemporary practice, the OSI model is not followed strictly. In general terms, layers 1 and 2 are often called the "Ethernet" layer (though in large data centers, Ethernet has often been supplanted by newer technologies). Layers 3 and 4 are often referred to as the transmission control protocol/internet protocol (TCP/IP) layer (which may be further subdivided into TCP and IP layers). Layers 5-7 may be referred to as the "application layer." These layer definitions are disclosed as a useful framework, but are intended to be nonlimiting.

Figure 2:
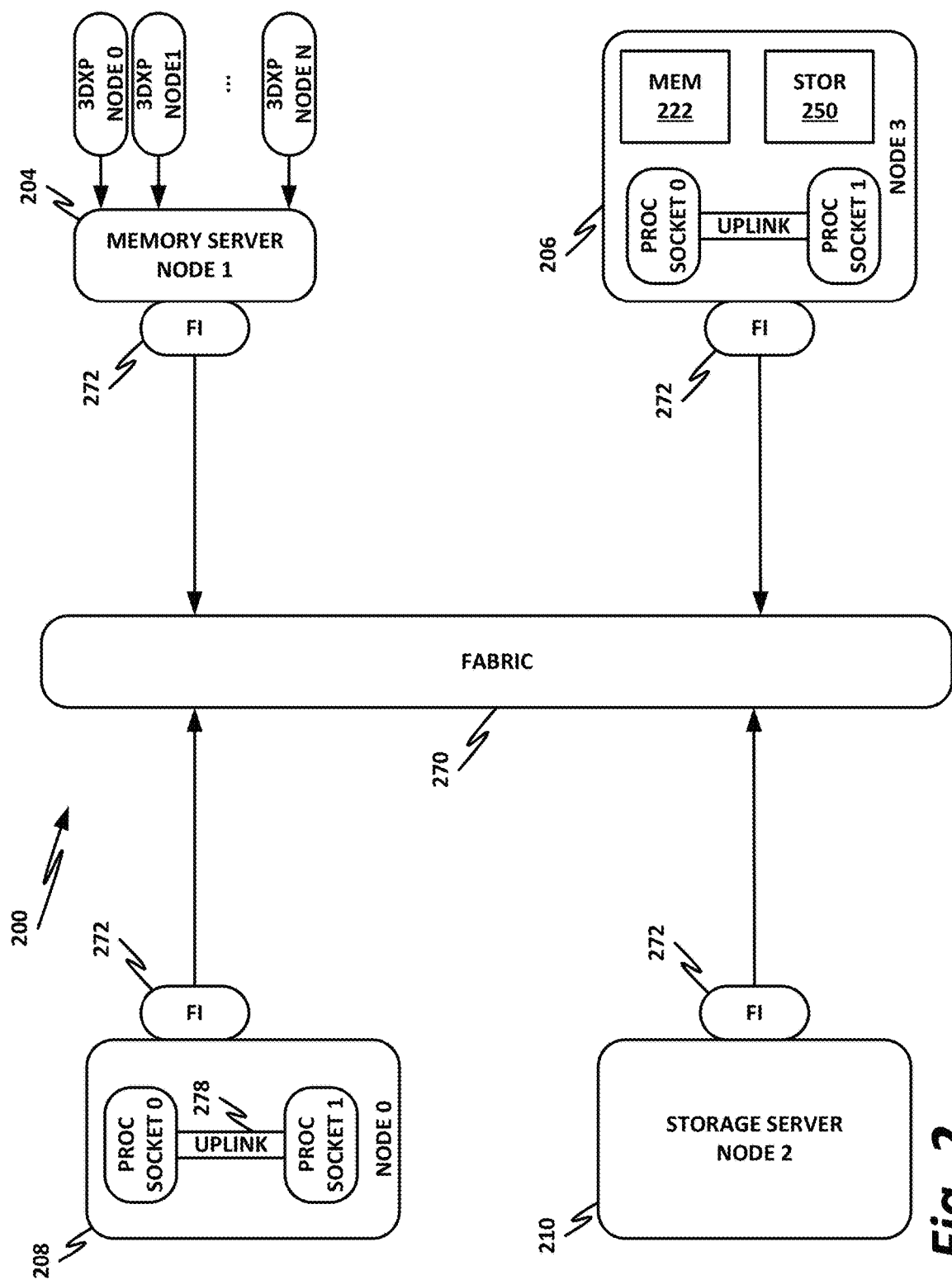
FIG. 2 is a block diagram of a data center, according to one or more examples of the present specification.

FIG. 2 is a block diagram of a data center 200 according to one or more examples of the present specification. Data center 200 may be, in various embodiments, the same data center as Data Center 100 of FIG. 1, or may be a different data center. Additional views are provided in FIG. 2 to illustrate different aspects of data center 200.

In this example, a fabric 270 is provided to interconnect various aspects of data center 200. Fabric 270 may be the same as fabric 170 of FIG. 1, or may be a different fabric. As above, fabric 270 may be provided by any suitable interconnect technology. In this example, Intel® OmniPath™ is used as an illustrative and nonlimiting example.

As illustrated, data center 200 includes a number of logic elements forming a plurality of nodes. It should be understood that each node may be provided by a physical server, a group of servers, or other hardware. Each server may be running one or more virtual machines as appropriate to its application.

Node 0 208 is a processing node including a processor socket 0 and processor socket 1. The processors may be, for example, Intel® Xeon™ processors with a plurality of cores, such as 4 or 8 cores. Node 0 208 may be configured to provide network or workload functions, such as by hosting a plurality of virtual machines or virtual appliances.

Onboard communication between processor socket 0 and processor socket 1 may be provided by an onboard uplink 278. This may provide a very high speed, short-length interconnect between the two processor sockets, so that virtual machines running on node 0 208 can communicate with one another at very high speeds. To facilitate this communication, a virtual switch (vSwitch) may be provisioned on node 0 208, which may be considered to be part of fabric 270.

Node 0 208 connects to fabric 270 via a fabric interface 272. Fabric interface 272 may be any appropriate fabric interface as described above, and in this particular illustrative example, may be an Intel® Host Fabric Interface for connecting to an Intel® OmniPath™ fabric. In some examples, communication with fabric 270 may be tunneled, such as by providing UPI tunneling over OmniPath™.

Because data center 200 may provide many functions in a distributed fashion that in previous generations were provided onboard, a highly capable fabric interface 272 may be provided. Fabric interface 272 may operate at speeds of multiple gigabits per second, and in some cases may be tightly coupled with node 0 208. For example, in some embodiments, the logic for fabric interface 272 is integrated directly with the processors on a system-on-a-chip. This provides very high speed communication between fabric interface 272 and the processor sockets, without the need for intermediary bus devices, which may introduce additional latency into the fabric. However, this is not to imply that embodiments where fabric interface 272 is provided over a traditional bus are to be excluded. Rather, it is expressly anticipated that in some examples, fabric interface 272 may be provided on a bus, such as a PCIe bus, which is a serialized version of PCI that provides higher speeds than traditional PCI. Throughout data center 200, various nodes may provide different types of fabric interfaces 272, such as onboard fabric interfaces and plug-in fabric interfaces. It should also be noted that certain blocks in a system on a chip may be provided as intellectual property (IP) blocks that can be "dropped" into an integrated circuit as a modular unit. Thus, fabric interface 272 may in some cases be derived from such an IP block.

Note that in "the network is the device" fashion, node 0 208 may provide limited or no onboard memory or storage. Rather, node 0 208 may rely primarily on distributed services, such as a memory server and a networked storage server. Onboard, node 0 208 may provide only sufficient memory and storage to bootstrap the device and get it communicating with fabric 270. This kind of distributed architecture is possible because of the very high speeds of contemporary data centers, and may be advantageous because there is no need to over-provision resources for each node. Rather, a large pool of high-speed or specialized memory may be dynamically provisioned between a number of nodes, so that each node has access to a large pool of resources, but those resources do not sit idle when that particular node does not need them.

In this example, a node 1 memory server 204 and a node 2 storage server 210 provide the operational memory and storage capabilities of node 0 208. For example, memory server node 1 204 may provide remote direct memory access (RDMA), whereby node 0 208 may access memory resources on node 1 204 via fabric 270 in a DMA fashion, similar to how it would access its own onboard memory. The memory provided by memory server 204 may be traditional memory, such as double data rate type 3 (DDR3) dynamic random access memory (DRAM), which is volatile, or may be a more exotic type of memory, such as a persistent fast memory (PFM) like Intel® 3D Crosspoint™ (3DXP), which operates at DRAM-like speeds, but is nonvolatile.

Similarly, rather than providing an onboard hard disk for node 0 208, a storage server node 2 210 may be provided. Storage server 210 may provide a networked bunch of disks (NBOD), PFM, redundant array of independent disks (RAID), redundant array of independent nodes (RAIN), network attached storage (NAS), optical storage, tape drives, or other nonvolatile memory solutions.

Thus, in performing its designated function, node 0 208 may access memory from memory server 204 and store results on storage provided by storage server 210. Each of these devices couples to fabric 270 via a fabric interface 272, which provides fast communication that makes these technologies possible.

By way of further illustration, node 3 206 is also depicted. Node 3 206 also includes a fabric interface 272, along with two processor sockets internally connected by an uplink. However, unlike node 0 208, node 3 206 includes its own onboard memory 222 and storage 250. Thus, node 3 206 may be configured to perform its functions primarily onboard, and may not be required to rely upon memory server 204 and storage server 210. However, in appropriate circumstances, node 3 206 may supplement its own onboard memory 222 and storage 250 with distributed resources similar to node 0 208.

The basic building block of the various components disclosed herein may be referred to as "logic elements." Logic elements may include hardware (including, for example, a software-programmable processor, an ASIC, or an FPGA), external hardware (digital, analog, or mixed-signal), software, reciprocating software, services, drivers, interfaces, components, modules, algorithms, sensors, components, firmware, microcode, programmable logic, or objects that can coordinate to achieve a logical operation. Furthermore, some logic elements are provided by a tangible, non-transitory computer-readable medium having stored thereon executable instructions for instructing a processor to perform a certain task. Such a non-transitory medium could include, for example, a hard disk, solid state memory or disk, read-only memory (ROM), persistent fast memory (PFM) (e.g., Intel® 3D Crosspoint™), external storage, redundant array of independent disks (RAID), redundant array of independent nodes (RAIN), network-attached storage (NAS), optical storage, tape drive, backup system, cloud storage, or any combination of the foregoing by way of nonlimiting example. Such a medium could also include instructions programmed into an FPGA, or encoded in hardware on an ASIC or processor.

Figure 3:
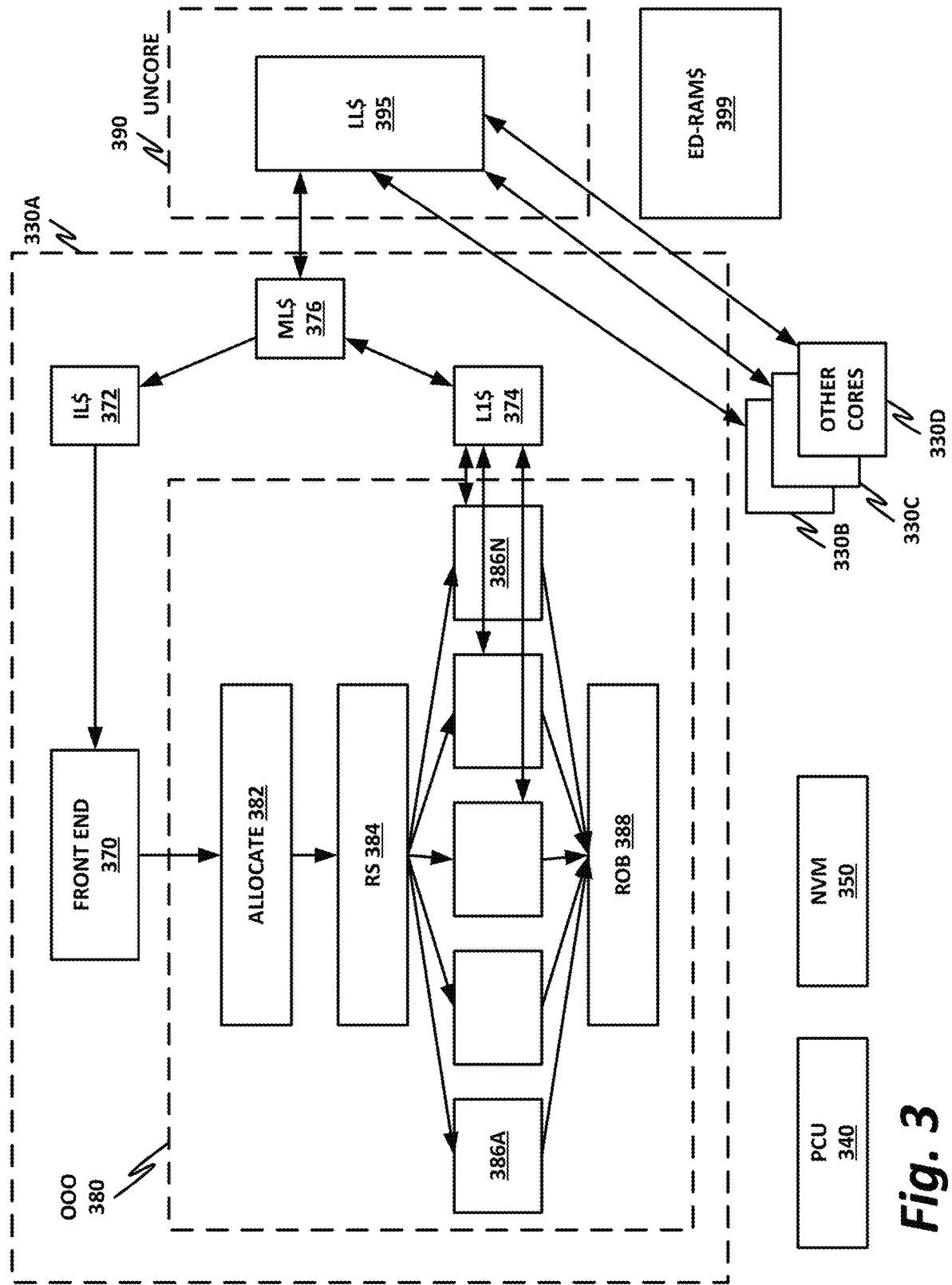
FIG. 3 illustrates a block diagram of a central processing unit, according to one or more examples of the present specification.

FIG. 3 illustrates a block diagram of a central processing unit (CPU) 312 in accordance with certain embodiments. Although CPU 312 depicts a particular configuration, the cores and other components of CPU 312 may be arranged in any suitable manner. CPU 312 may comprise any processor or processing device, such as a microprocessor, an embedded processor, a digital signal processor (DSP), a network processor, an application processor, a co-processor, a system on a chip (SOC), or other device to execute code. CPU 312, in the depicted embodiment, includes four processing elements (cores 330 in the depicted embodiment), which may include asymmetric processing elements or symmetric processing elements. However, CPU 312 may include any number of processing elements that may be symmetric or asymmetric.

Examples of hardware processing elements include: a thread unit, a thread slot, a thread, a process unit, a context, a context unit, a logical processor, a hardware thread, a core, and/or any other element, which is capable of holding a state for a processor, such as an execution state or architectural state. In other words, a processing element, in one embodiment, refers to any hardware capable of being independently associated with code, such as a software thread, operating system, application, or other code. A physical processor (or processor socket) typically refers to an integrated circuit, which potentially includes any number of other processing elements, such as cores or hardware threads.

A core may refer to logic located on an integrated circuit capable of maintaining an independent architectural state, wherein each independently maintained architectural state is associated with at least some dedicated execution resources. A hardware thread may refer to any logic located on an integrated circuit capable of maintaining an independent architectural state, wherein the independently maintained architectural states share access to execution resources. A physical CPU may include any suitable number of cores. In various embodiments, cores may include one or more out-of-order processor cores or one or more in-order processor cores. However, cores may be individually selected from any type of core, such as a native core, a software managed core, a core adapted to execute a native instruction set architecture (ISA), a core adapted to execute a translated ISA, a co-designed core, or other known core. In a heterogeneous core environment (i.e. asymmetric cores), some form of translation, such as binary translation, may be utilized to schedule or execute code on one or both cores.

In the embodiment depicted, core 330A includes an out-of-order processor that has a front end unit 370 used to fetch incoming instructions, perform various processing (e.g. caching, decoding, branch predicting, etc.) and passing instructions/operations along to an out-of-order (OOO) engine. The OOO engine performs further processing on decoded instructions.

A front end 370 may include a decode module coupled to fetch logic to decode fetched elements. Fetch logic, in one embodiment, includes individual sequencers associated with thread slots of cores 330. Usually a core 330 is associated with a first ISA, which defines/specifies instructions executable on core 330. Often machine code instructions that are part of the first ISA include a portion of the instruction (referred to as an opcode), which references/specifies an instruction or operation to be performed. The decode module may include circuitry that recognizes these instructions from their opcodes and passes the decoded instructions on in the pipeline for processing as defined by the first ISA. Decoders of cores 330, in one embodiment, recognize the same ISA (or a subset thereof). Alternatively, in a heterogeneous core environment, a decoder of one or more cores (e.g., core 330B) may recognize a second ISA (either a subset of the first ISA or a distinct ISA).

In the embodiment depicted, the out-of-order engine includes an allocate unit 382 to receive decoded instructions, which may be in the form of one or more micro-instructions or uops, from front end unit 370, and allocate them to appropriate resources such as registers and so forth. Next, the instructions are provided to a reservation station 384, which reserves resources and schedules them for execution on one of a plurality of execution units 386A-386N. Various types of execution units may be present, including, for example, arithmetic logic units (ALUs), load and store units, vector processing units (VPUs), floating point execution units, among others. Results from these different execution units are provided to a reorder buffer (ROB) 388, which take unordered results and return them to correct program order.

In the embodiment depicted, both front end unit 370 and out-of-order engine 380 are coupled to different levels of a memory hierarchy. Specifically shown is an instruction level cache 372, that in turn couples to a mid-level cache 376, that in turn couples to a last level cache 395. In one embodiment, last level cache 395 is implemented in an on-chip (sometimes referred to as uncore) unit 390. Uncore 390 may communicate with system memory 399, which, in the illustrated embodiment, is implemented via embedded DRAM (eDRAM). The various execution units 686 within OOO engine 380 are in communication with a first level cache 374 that also is in communication with mid-level cache 376. Additional cores 330B-330D may couple to last level cache 395 as well.

In particular embodiments, uncore 390 may be in a voltage domain and/or a frequency domain that is separate from voltage domains and/or frequency domains of the cores. That is, uncore 390 may be powered by a supply voltage that is different from the supply voltages used to power the cores and/or may operate at a frequency that is different from the operating frequencies of the cores.

CPU 312 may also include a power control unit (PCU) 340. In various embodiments, PCU 340 may control the supply voltages and the operating frequencies applied to each of the cores (on a per-core basis) and to the uncore. PCU 340 may also instruct a core or uncore to enter an idle state (where no voltage and clock are supplied) when not performing a workload.

In various embodiments, PCU 340 may detect one or more stress characteristics of a hardware resource, such as the cores and the uncore. A stress characteristic may comprise an indication of an amount of stress that is being placed on the hardware resource. As examples, a stress characteristic may be a voltage or frequency applied to the hardware resource; a power level, current level, or voltage level sensed at the hardware resource; a temperature sensed at the hardware resource; or other suitable measurement. In various embodiments, multiple measurements (e.g., at different locations) of a particular stress characteristic may be performed when sensing the stress characteristic at a particular instance of time. In various embodiments, PCU 340 may detect stress characteristics at any suitable interval.

In various embodiments, PCU 340 is a component that is discrete from the cores 330. In particular embodiments, PCU 340 runs at a clock frequency that is different from the clock frequencies used by cores 630. In some embodiments where the PCU is a microcontroller, PCU 340 executes instructions according to an ISA that is different from an ISA used by cores 330.

In various embodiments, CPU 312 may also include a nonvolatile memory 350 to store stress information (such as stress characteristics, incremental stress values, accumulated stress values, stress accumulation rates, or other stress information) associated with cores 330 or uncore 390, such that when power is lost, the stress information is maintained.

Figure 4:
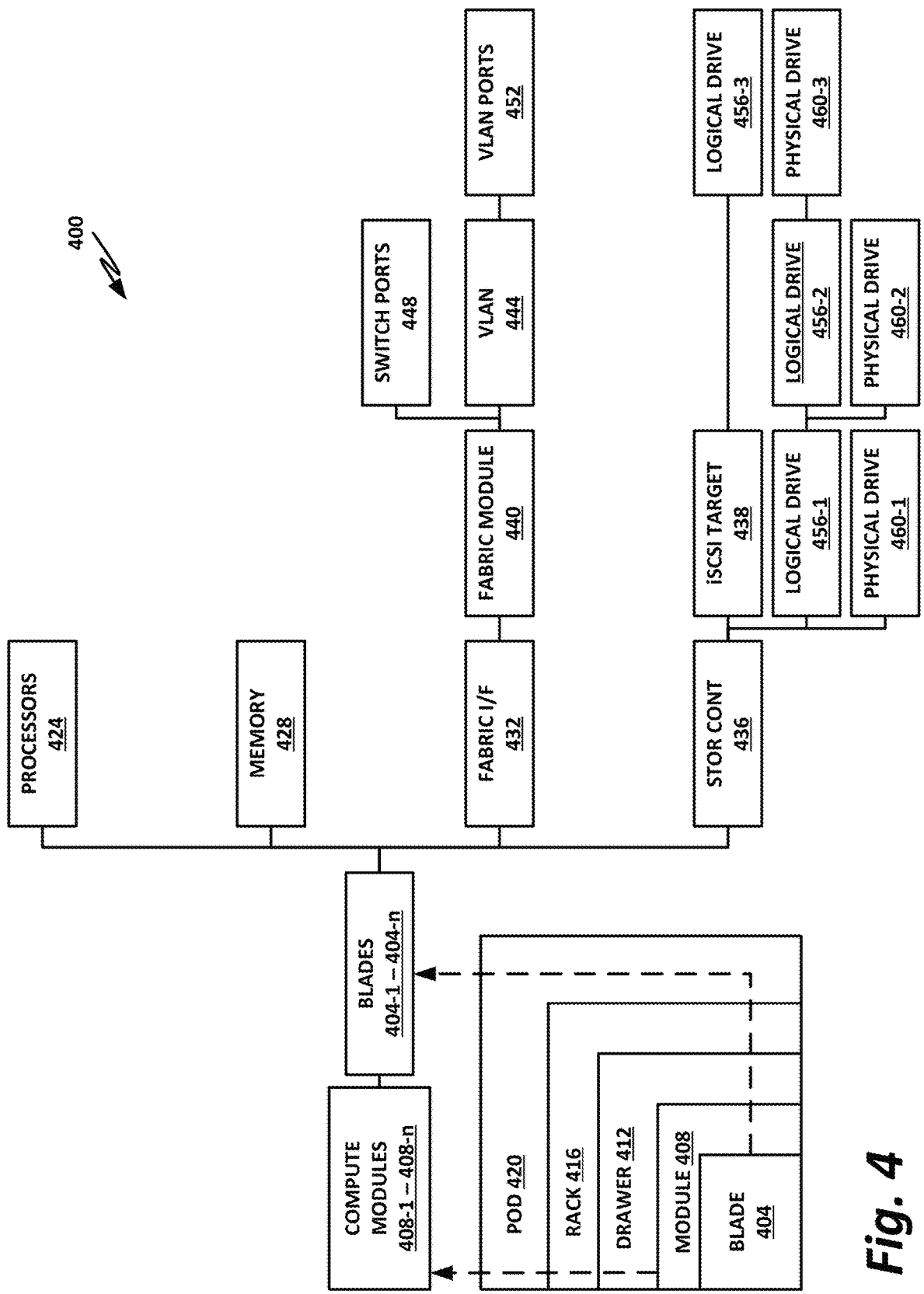
FIG. 4 is a block diagram of a data center computing architecture, according to one or more examples of the present specification.

FIG. 4 is a block diagram of a data center computing architecture according to one or more examples of the present specification. Architecture 400 illustrates the interdependency of the various components in a data center, such that error processing can affect more than one container.

In this example, a blade chassis 404 includes blades 404-1 through 404-*n*. Blade chassis 404 may be embodied as a multi-u module 408, which includes compute modules 408-1 through 408-*n*. Compute module 408 may be encased within a drawer 412. Drawer 412 may fit into one or more slots of rack 416. And rack 416 may be part of a replaceable data center pod 420.

Blades 404-1 through 404-*n* may provide a plurality of resources, such as processors 424, memory 428, fabric interfaces 432, and storage containers 436. Fabric interface 432 may couple a compute node to a fabric module 440. Fabric module 440 may provide switch ports 448 and connect to a VLAN 444. VLAN 444 may include a number of VLAN ports 452.

Storage container 436 may include an iSCSI target 438, and one or more logical drives 456, with each logical drive 456 hosted on a physical drive 460.

As discussed above, the various containers in a single compute node running on an operating system instance may isolate many of these resources from one another.

However, the error recovery paradigm in such a system may be based on a machine check architecture. In that case, on error consumption, the machine check exception is handled immediately. For recoverable errors, the respective task is killed by the operating system, and the OS may then isolate the memory from further usage to avoid future errors. In the case of a nonrecoverable error, the entire machine is brought down with a cold reboot to recover nominal system operation.

In the case of such nonrecoverable errors, when the entire machine is brought down, a firmware first model may be applied to alleviate some issues, but firmware first does not necessarily address data loss. Furthermore, when the task is killed or the machine is rebooted, there may be minimal hardware error harvesting. This may provide minimal insight into application level failure analysis. For example, the Microsoft bug check 0x124, named Windows Hardware Error Architecture (WHEA)_uncorrectable_error, does not provide information other than the WHEA records.

In contrast, with delayed error handling, the faulty memory region may be isolated immediately for both recoverable and nonrecoverable error cases. This optimizes operating expenses by providing the operator with the option to plan the service. It also improves manageability by improving task scheduling control such as machine development and operations (DevOps). Furthermore, it can provide predictive failure analysis of memory type or make.

With regards to data loss, the system described herein removes the container that was impacted by the error, and saves the machine check context for future service. This allows remaining containers to continue execution without immediate interruption, thus reducing data loss and increasing system uptime and availability. With regard to failure analysis, the present solution may keep, besides the error record, a task specific record or context in memory. This allows further post-processing or postmortem failure analysis.

Figure 5:
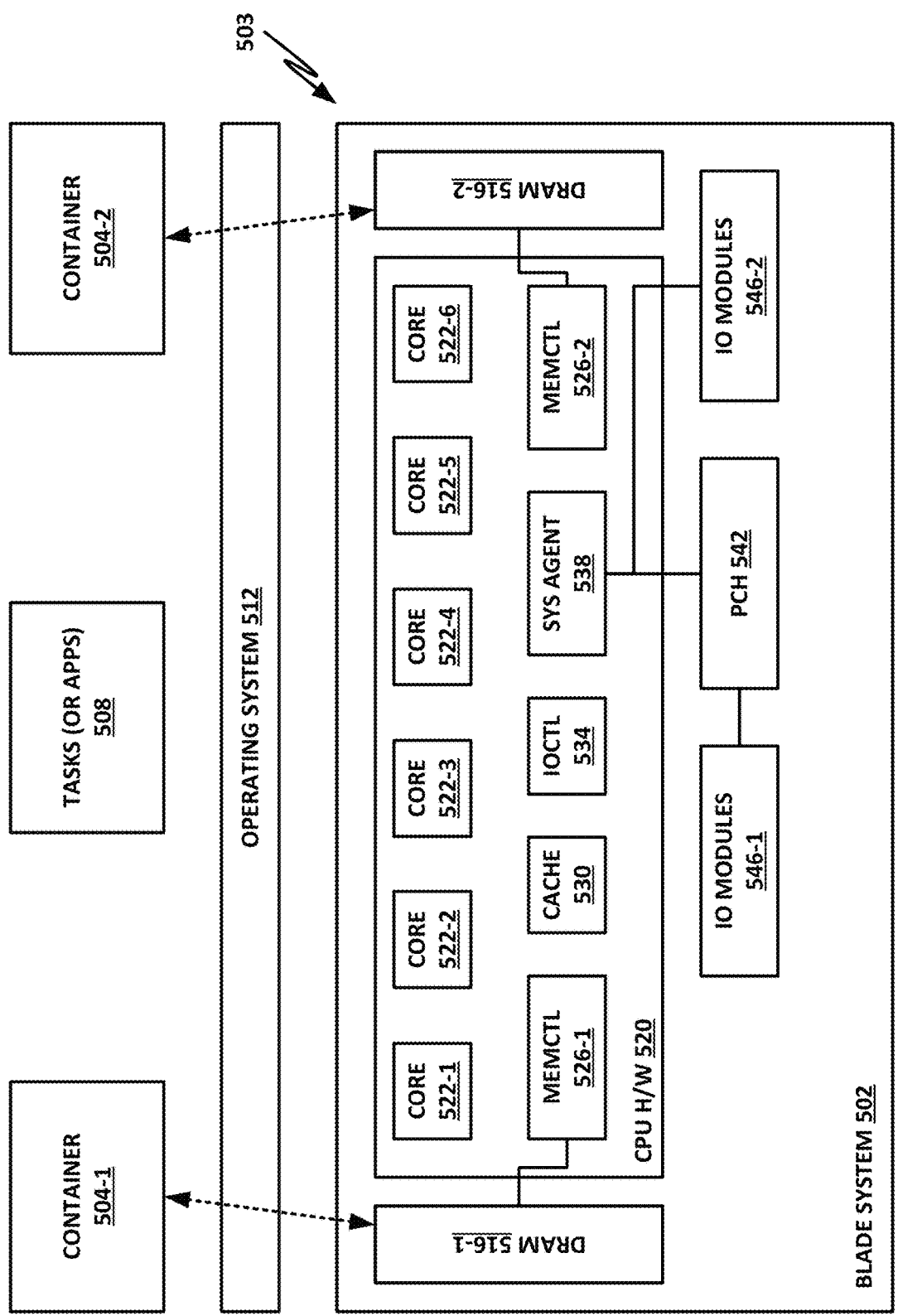
FIG. 5 is a block diagram illustrating how recovery of an uncorrectable error affects multiple containers, according to one or more examples of the present specification.

FIG. 5 is a block diagram illustrating how recovery of an uncorrectable error affects multiple containers according to one or more examples of the present specification. In the example of FIG. 5, a blade system 502 hosts a compute platform 503 providing hardware for data center processes. Running on blade system 502 are an operating system 512 which hosts a plurality of tasks or applications 508, and also provides two containers, namely container 504-1 and container 504-2.

Hardware platform 503 may include various components to provide the hardware services for the software components of the system. This may include a plurality of cores 522-1 through 522-6. Cores 522 may access one or more DRAM modules such as DRAM 516-1 and DRAM 516-2. Memory controllers 526-1 and 526-2 may provide hardware control to DRAM modules 516. One or more levels of cache 530 may also be provided. An input output controller (IOCTL) 534 may provide input and output operations. A system agent 538 may provide, for example, firmware for detecting and recovering from errors among other system services. System agent 538 may interface with one or more I/O modules 546 either directly as in the case of I/O module 546-2, or via platform controller hub (PCH) 542.

It should be understood that blade system 502 is provided only as a nonlimiting and illustrative example of a hardware platform 503 that may provide compute services. Many other configurations are possible, and the present specification is not intended to be limited to the example of a blade system 502 or any other specific hardware platform.

An error may occur, for example, when container 504-1 is accessing a block of memory within DRAM 516-1. The block of memory may be specifically partitioned and dedicated to container 504-1, and may thus not be accessible to container 504-2. While performing its operation and accessing DRAM 516-1, container 504-1 may encounter an uncorrectable error. This could be, for example, the result of faulty programming resulting in an uncorrectable software error, or it could be the result of a hardware failure within DRAM 516-1, such as a bad or corrupted memory block.

In its turn, container 504-2 may be accessing a completely separate memory block, which could be located on DRAM 516-1, or could be located in a completely separate DRAM such as DRAM 516-2. Because container 504-1 and container 504-2 have separately partitioned memory blocks, the memory error that container 504-1 encounters does not directly affect container 504-2. However, because the error on container 504-1 is an uncorrectable error, it may not be possible to restore the function of container 504-1 without restarting blade system 502. When blade system 502 is restarted, the memory can be checked, and if the error is a result of a hardware error, then in some cases the bad memory block can be removed from circulation so that it is not addressable, and blade system 502 can then continue functioning normally.

However, if blade system 502 is taken down by system agent 538 immediately upon container 504-1 encountering the uncorrectable error, then container 504-2 also is immediately taken down. Thus, although the memory error encountered by container 504-1 does not directly affect container 504-2, the cold reboot required to recover container 504-1 does affect container 504-2. Furthermore, an immediate cold reboot without any warning to container 504-2 may result in container 504-2 losing data and/or corrupting data.

If container 504-2 is providing a function that is higher priority than container 504-1, this also means that a high priority function is terminated or stalled as a result of a an error in a relatively lower priority function. As discussed above, container 504-1 could be an email server, while container 504-2 could be a high-availability database server. In that case, taking down blade system 502 without warning to container 504-2 may cause data loss or database corruption in container 504-2.

It is therefore advantageous in some embodiments, rather than immediately re-starting blade system 502, to notify container 504-2 that a cold reboot will be necessary, and to then wait for container 504-2 to get to a good "stopping place" before taking down blade system 502. This notification instructs container 504-2 to seek a recoverable state, as described herein. Note that notification to container 504-2 is provided by way of nonlimiting example. In other embodiments, system agent 538 may simply monitor container 504-2 and autonomously determine when container 504-2 has reached a recoverable state. Also note that other network elements, such as an orchestrator or controller, may help in container 504-2 in seeking a recoverable state, such as by instructing load balancers to direct less traffic to container 504-2.

Once blade system 502 reaches a state in which all containers are in a suitable state for restarting, system agent 538 may then perform its normal error handling, up to and including a cold restart of blade system 502. In the meantime, container 504-1 may be stalled and unavailable, but the loss of container 504-1 can often be ameliorated in a data center, particularly one that provides software defined networking and orchestrated functions, by simply spawning a new instance of the function provided by container 504-1. In some cases, if container 504-2 provides a function that is very intolerant of interruption, then before blade system 502 is restarted, a new instance of the function of container 504-2 may be spawned, and a handoff may be completed between the two instances so that the restart is relatively seamless.

Figure 6A:
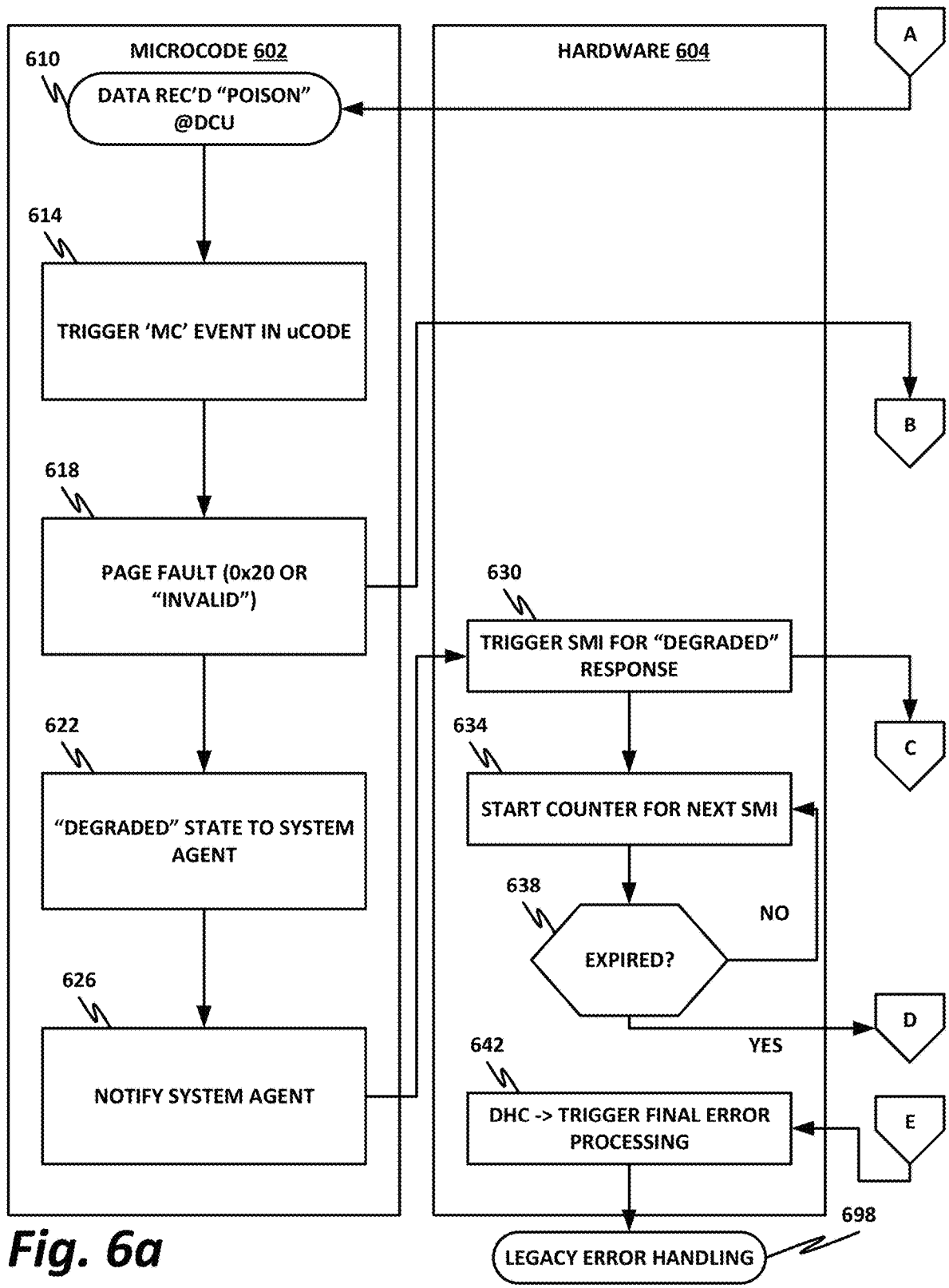
FIGS. 6a-6b are a signal flow diagram of a method of performing delayed error processing according to one or more examples of the present specification.
Figure 6B:
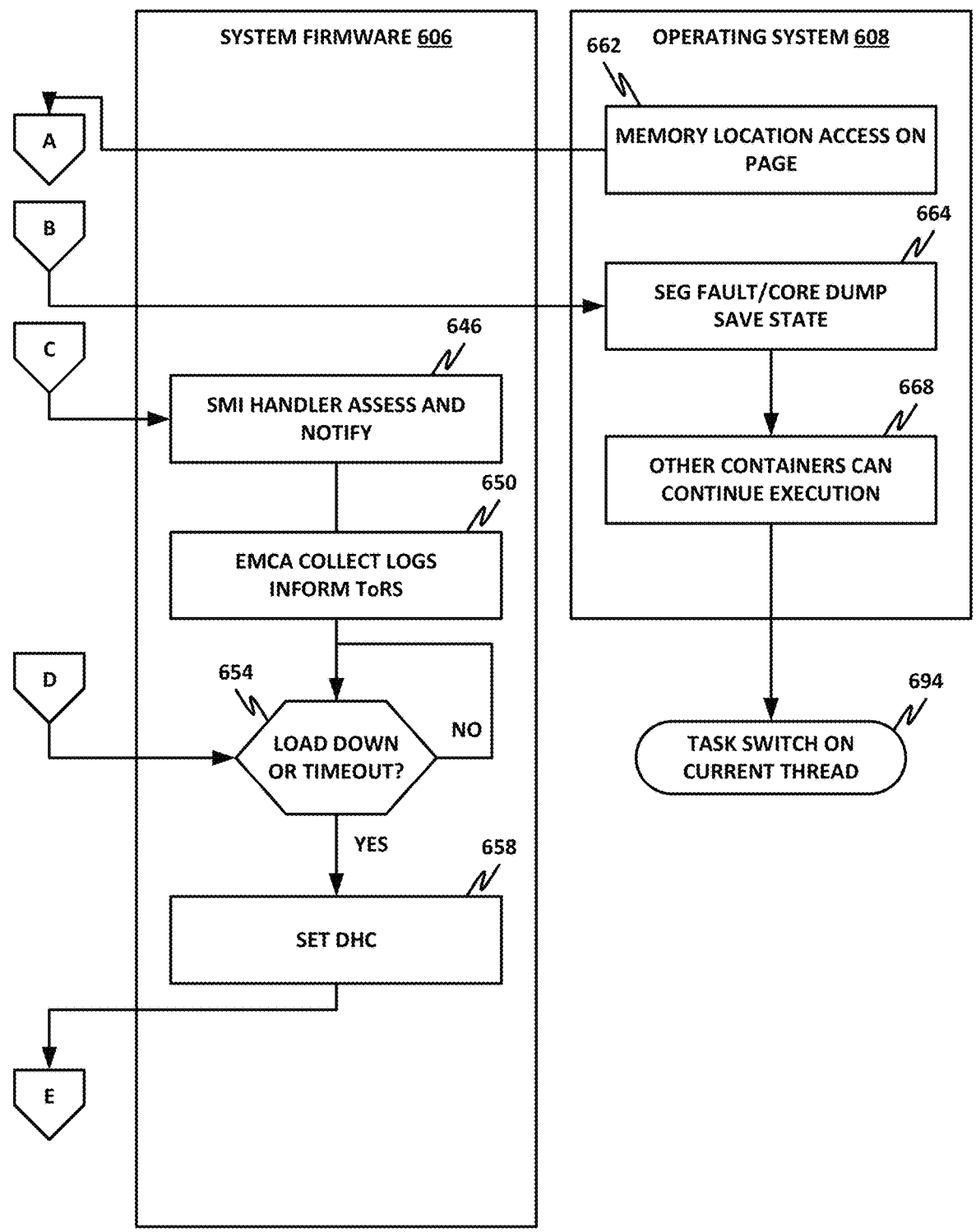

FIGS. 6A-6B are a signal flow diagram of a method of performing delayed error processing according to one or more examples of the present specification. The example of FIGS. 6A-6B illustrates interactions between an operating system 608, system firmware 606 which may provide a system agent, CPU hardware 604, and CPU microcode 602. The logic represented herein is divided into separate blocks by way of illustration of an embodiment. However, it should be understood that the divisions shown here are illustrative only, and functions provided in one block can in many instances be moved to another block. In particular, the division between microcode 602 and hardware 604 in a CPU is often a matter of design optimization, and it is often practical to move functionality between one or the other in different embodiments. Furthermore, functions provided by system firmware 606 may often be moved to microcode 602, or be provided in other places.

In the illustrated example, starting in operating system 608 in FIG. 6B, at block 662, a memory location performs a memory access on a memory page. This access flows from off-page connector A to microcode 602, where at block 610, a data collector unit (DCU) receives the data access request and determines that this is a "poison" access request. In other words, the memory of this location is corrupted or otherwise inaccessible, and the memory access cannot continue.

In block 614, responsive to receiving an indication that poison data has been received, the microcode may take appropriate action, such as triggering an "memory corrupt" event in the microcode.

In block 618, responsive to the memory corrupt event, the microcode 602 may issue an error signal. In one example, the error signal is a page fault with error code 0x20 or some other "invalid" indicator. In another example, the page fault may have a null page fault code or some specifically designated poison code may be used. The purpose of this specific code may be to trigger a segmentation fault on the operating system, or an architectural state dump for replaying a container again if necessary. This is similar to context switched during SMM or real mode to protected mode transition.

The page fault may be sent via off-page connector B to operating system 608. In block 664, operating system 608 may trigger a segmentation fault. A core dump may occur, and the application may be removed from execution. The architectural state may be saved for future replay. Advantageously, with a core dump, a debugger may be used to analyze the program flow, to determine what caused the memory error and to avoid future memory errors.

In block 668, on operating system 608, other containers on the hardware platform may continue execution.

In block 694, a task switch may be executed to threads of the other containers.

Returning to block 618, within microcode 602, a degraded state is issued to the system agent.

In block 622, the microcode 602 may trigger a "degraded" state to system agent of firmware 606. The degraded state may be used to notify both resources on the platform itself, and other resources in the data center that the containers on this hardware platform should now be considered "degraded."

In one example, the degraded state is triggered with a new degraded state register. An example implementation of a degraded state register may include the following:

| TIMER [63:07] | COUNTER [6:3] | DELAYED HANDLING COMPLETE [2:2] | EN/MCE/ DHC [1:1] | MCE TRIGGER [0:0] |
|---|---|---|---|---|
| Offset for the event to be triggered. | The delayed state can be retained until the counter has reached the maximum value | Has firmware completed the delayed error handling? Setting this bit triggers the next sequence (e.g., error handling may proceed). | Enable machine check exception (MCE) on delayed handling complete | Trigger MCE now (relevant for debug cases). |

In block 626, microcode 602 may notify the system agent of the degraded state.

For example, within hardware 604, at block 630 the system agent receives the degraded state signal, and may trigger an SMI for the initial degraded response handling. The SMI may be issued to an SMI handler in firmware via off-page connector C.

Within hardware 604, the system agent may then start a counter for the next SMI generation. This counter may be used to ensure that none of the other containers take too long to reach a recoverable state and unnecessarily delay recovery of the hardware platform.

Thus, in decision block 638, hardware 604 continuously monitors the timeout to see if it has expired. As long as the timeout does not expire, then the system agent continues to wait for the container to reach a graceful exit point.

If the timer expires without the other containers reaching a suitable exit point, then flow continues to off-page connector D.

Returning to FIG. 6B, from off-page connector C, the SMI handler in system firmware 606 receives the SMI notifying it of the degraded state.

In block 646, the SMI handler assesses whether the system is in a degraded state. If the system has been identified as being in a degraded state, it may notify the operating system of the planned shutdown or maintenance cycle. The operating system may then notify other containers that they should begin working toward a resettable point. The operating system may also notify other data center components, such as a data center orchestrator, so that the orchestrator can take measures to reduce the workload on the degraded containers. For example, if an email container encounters an error, and a database driver is running on a separate container on the same hardware platform, when the operating system notifies the orchestrator that the database driver is running in a degraded state, the orchestrator may begin directing traffic away from that database driver instance as much as possible. For example, the orchestrator could spawn a new instance of the database driver if sufficient resources are available. The orchestrator could also instruct a load balancer not to assign any new traffic buckets to the degraded instance of the database driver. To further reduce load on the database driver, the orchestrator could gradually instruct the load balancer to reassign existing buckets to other instances. This may allow the degraded instance of the database driver to reach a state where it is not receiving any new incoming traffic. It can then gracefully complete processing of any pending requests, and once it has no pending requests, it is in a state that it can shut down gracefully, and may notify the system agent of the same.

In block 650, if machine check architecture (MCA) or enhanced MCA (EMCA) is enabled, then the SMI handler may collect appropriate logs; the SMI handler may also notify, for example, a top of rack switch or remote monitoring and management (RMM) of the degraded system state. This could be in addition to or instead of notification provided by operating system 608.

In decision block 654, system firmware 606 receives the hard timeout limit from hardware 604. In a loop, the SMI handler may continuously check whether the other containers have reached a recoverable state, such as if the system agent or the system firmware has received notification that the other containers are no longer handling new incoming traffic. Alternately, the hard timeout may occur.

Either one of these events eventually triggers SMI handler 606 to set the delayed handling complete bit.

Once the delayed handling complete bit is set, control flows through off-page connector E back to FIG. 6A. In block 642, the delayed handling complete bit triggers final error processing by SMI or MCE.

Once the final error processing has been triggered, in block 698, the error is handled according to existing error handling methods as described herein.

The foregoing outlines features of several embodiments so that those skilled in the art may better understand various aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

All or part of any hardware element disclosed herein may readily be provided in a system-on-a-chip (SoC), including central processing unit (CPU) package. An SoC represents an integrated circuit (IC) that integrates components of a computer or other electronic system into a single chip. Thus, for example, client devices or server devices may be provided, in whole or in part, in an SoC. The SoC may contain digital, analog, mixed-signal, and radio frequency functions, all of which may be provided on a single chip substrate. Other embodiments may include a multichip module (MCM), with a plurality of chips located within a single electronic package and configured to interact closely with each other through the electronic package.

Note also that in certain embodiments, some of the components may be omitted or consolidated. In a general sense, the arrangements depicted in the figures may be more logical in their representations, whereas a physical architecture may include various permutations, combinations, and/ or hybrids of these elements. It is imperative to note that countless possible design configurations can be used to achieve the operational objectives outlined herein. Accordingly, the associated infrastructure has a myriad of substitute arrangements, design choices, device possibilities, hardware configurations, software implementations, and equipment options.

In a general sense, any suitably-configured processor can execute any type of instructions associated with the data to achieve the operations detailed herein. Any processor disclosed herein could transform an element or an article (for example, data) from one state or thing to another state or thing. In operation, a storage may store information in any suitable type of tangible, nontransitory storage medium (for example, random access memory (RAM), read only memory (ROM), field programmable gate array (FPGA), erasable programmable read only memory (EPROM), electrically erasable programmable ROM (EEPROM), etc.), software, hardware (for example, processor instructions or microcode), or in any other suitable component, device, element, or object where appropriate and based on particular needs. Furthermore, the information being tracked, sent, received, or stored in a processor could be provided in any database, register, table, cache, queue, control list, or storage structure, based on particular needs and implementations, all of which could be referenced in any suitable timeframe. Any of the memory or storage elements disclosed herein, should be construed as being encompassed within the broad terms "memory" and "storage," as appropriate. A nontransitory storage medium herein is expressly intended to include any nontransitory special-purpose or programmable hardware configured to provide the disclosed operations, or to cause a processor to perform the disclosed operations.

Computer program logic implementing all or part of the functionality described herein is embodied in various forms, including, but in no way limited to, a source code form, a computer executable form, machine instructions or microcode, programmable hardware, and various intermediate forms (for example, forms generated by an assembler, compiler, linker, or locator). In an example, source code includes a series of computer program instructions implemented in various programming languages, such as an object code, an assembly language, or a high-level language such as OpenCL, FORTRAN, C, C++, JAVA, or HTML for use with various operating systems or operating environments, or in hardware description languages such as Spice, Verilog, and VHDL. The source code may define and use various data structures and communication messages. The source code may be in a computer executable form (e.g., via an interpreter), or the source code may be converted (e.g., via a translator, assembler, or compiler) into a computer executable form, or converted to an intermediate form such as byte code. Where appropriate, any of the foregoing may be used to build or describe appropriate discrete or integrated circuits, whether sequential, combinatorial, state machines, or otherwise.

In one example embodiment, any number of electrical circuits of the FIGURES may be implemented on a board of an associated electronic device. The board can be a general circuit board that can hold various components of the internal electronic system of the electronic device and, further, provide connectors for other peripherals. Any suitable processor and memory can be suitably coupled to the board based on particular configuration needs, processing demands, and computing designs. Note that with the numerous examples provided herein, interaction may be described in terms of two, three, four, or more electrical components. However, this has been done for purposes of clarity and example only. It should be appreciated that the system can be consolidated or reconfigured in any suitable manner. Along similar design alternatives, any of the illustrated components, modules, and elements of the FIGURES may be combined in various possible configurations, all of which are within the broad scope of this specification.

Numerous other changes, substitutions, variations, alterations, and modifications may be ascertained to one skilled in the art and it is intended that the present disclosure encompass all such changes, substitutions, variations, alterations, and modifications as falling within the scope of the appended claims. In order to assist the United States Patent and Trademark Office (USPTO) and, additionally, any readers of any patent issued on this application in interpreting the claims appended hereto, Applicant wishes to note that the Applicant: (a) does not intend any of the appended claims to invoke paragraph six (6) of 35 U.S.C. section 112 (pre-AIA) or paragraph (f) of the same section (post-AIA), as it exists on the date of the filing hereof unless the words "means for" or "steps for" are specifically used in the particular claims; and (b) does not intend, by any statement in the specification, to limit this disclosure in any way that is not otherwise expressly reflected in the appended claims.

EXAMPLE IMPLEMENTATIONS

The following examples are provided by way of illustration.

Example 1 includes a computing apparatus, comprising: a hardware platform comprising a processor and memory; and a system management interrupt (SMI) handler; first logic configured to provide a first container and a second container via the hardware platform; and second logic configured to: detect an uncorrectable error in the first container; responsive to the detecting, generate a degraded system state; provide a degraded state message to the SMI handler; instruct the second container to seek a recoverable state; determine that the second container has entered a recoverable state; and initiate a recovery operation.

Example 2 includes the computing apparatus of example 1, wherein the second logic is further configured to set a timeout, and to initiate the recovery operation after expiration of the timeout.

Example 3 includes the computing apparatus of example 1, further comprising a fabric interface; wherein the second logic is further to provide degradation notification to a controller.

Example 4 includes the computing apparatus of example 3, wherein the second logic is further to request the controller to spawn a new instance of a service provided by the first container.

Example 5 includes the computing apparatus of example 1, wherein the recoverable state comprises a state in which the second container can be migrated with minimal data loss.

Example 6 includes the computing apparatus of example 5, wherein the second logic is further configured to migrate the second container.

Example 7 includes the computing apparatus of any of examples 1-6, further comprising an operating system, further configured to perform a core dump of the first container.

Example 8 includes the computing apparatus of example 7, wherein the operating system is configured to receive machine check architecture (MCA) logging information from the processor.

Example 9 includes the computing apparatus of example 7, wherein the second logic is further configured to notify the operating system of the degraded state of the apparatus.

Example 10 includes the computing apparatus of any of examples 1-6, wherein the second logic further comprises a configuration interface configured to receive configuration options.

Example 11 includes one or more tangible, non-transitory computer-readable mediums having stored thereon instructions for providing logic to: provide a system management interrupt (SMI) handler; provide a first container and a second container; detect an uncorrectable error in the first container; responsive to the detecting, generate a degraded system state; provide a degraded state message to the SMI handler; instruct the second container to seek a recoverable state; determine that the second container has entered a recoverable state; and initiate a recovery operation.

Example 12 includes the one or more tangible, non-transitory computer-readable mediums of example 11, wherein the logic is further configured to set a timeout, and to initiate the recovery operation after expiration of the timeout.

Example 13 includes the one or more tangible, non-transitory computer-readable mediums of example 11, wherein the logic is further to provide degradation notification to a controller via a fabric interface.

Example 14 includes the one or more tangible, non-transitory computer-readable mediums of example 13, wherein the logic is further to request the controller to spawn a new instance of a service provided by the first container.

Example 15 includes the one or more tangible, non-transitory computer-readable mediums of example 11, wherein the recoverable state comprises a state in which the second container can be migrated with minimal data loss.

Example 16 includes the one or more tangible, non-transitory computer-readable mediums of example 15, wherein the logic is further configured to migrate the second container.

Example 17 includes the one or more tangible, non-transitory computer-readable mediums of any of examples 11-16, wherein the logic is further configured to provide an operating system configured to perform a core dump of the first container.

Example 18 includes the one or more tangible, non-transitory computer-readable mediums of example 17, wherein the operating system is configured to receive machine check architecture (MCA) logging information from the processor.

Example 19 includes the one or more tangible, non-transitory computer-readable mediums of example 17, wherein the logic is further configure to notify the operating system of the degraded state of the apparatus.

Example 20 includes the one or more tangible, non-transitory computer-readable mediums of any of examples 11-16, wherein the second logic further comprises a configuration interface configured to receive configuration options.

Example 21 includes a computer-implemented method of providing delayed error processing, comprising: providing a system management interrupt (SMI) handler; providing a first container and a second container; detecting an uncorrectable error in the first container; responsive to the detecting, generating a degraded system state; providing a degraded state message to the SMI handler; instructing the second container to seek a recoverable state; determining that the second container has entered a recoverable state; and initiating a recovery operation.

Example 22 includes the method of example 21, further comprising setting a timeout, and to initiate the recovery operation after expiration of the timeout.

Example 23 includes the method of example 21, further comprising providing degradation notification to a controller via a fabric interface.

Example 24 includes the method of example 23, further comprising requesting the controller to spawn a new instance of a service provided by the first container.

Example 25 includes the method of example 21, wherein the recoverable state comprises a state in which the second container can be migrated with minimal data loss.

Example 26 includes the method of example 26, further comprising migrating the second container.

Example 27 includes the method of any of examples 21-26, further comprising providing an operating system configured to perform a core dump of the first container.

Example 28 includes the method of example 27, wherein the operating system is configured to receive machine check architecture (MCA) logging information from the processor.

Example 29 includes the method of example 27, further comprising notifying the operating system of the degraded state of the apparatus.

Example 30 includes the method of any of examples 21-26, further comprising providing a configuration interface configured to receive configuration options.

Example 31 includes an apparatus comprising means for performing the method of any of examples 21-30.

Example 32 includes the apparatus of example 31, wherein the means for performing the method comprise a processor and a memory.

Example 33 includes the apparatus of example 32, wherein the memory comprises machine-readable instructions, that when executed cause the apparatus to perform the method of any of examples 21-30.

Example 34 includes the apparatus of any of examples 31-33, wherein the apparatus is a computing system.

Example 35 includes at least one tangible, non-transitory computer readable medium comprising instructions that, when executed, implement a method or realize an apparatus as illustrated in any of examples 21-34.

What is claimed is:

1. A computing apparatus, comprising:
   a hardware platform comprising a processor and memory; and
   a system management interrupt (SMI) handler;
   first logic configured to provide a first container and a second container via the hardware platform; and
   second logic configured to:
     detect an uncorrectable system-level error caused by the first container, wherein the uncorrectable system-level error affects the first container and the second container;
     responsive to the detecting, generate a degraded system state;
     provide a degraded state message to the SMI handler;
     instruct the second container to seek a recoverable state;
     determine that the second container has entered a recoverable state; and
     after verifying that the second container has entered the recoverable state, initiate a recovery operation.

2. The computing apparatus of claim 1, wherein the second logic is further configured to set a timeout, and to initiate the recovery operation after expiration of the timeout.

3. The computing apparatus of claim 1, further comprising a fabric interface, wherein the second logic is further to provide degradation notification to a controller.

4. The computing apparatus of claim 3, wherein the second logic is further to request the controller to spawn a new instance of a service provided by the first container.

5. The computing apparatus of claim 1, wherein the recoverable state comprises a state in which the second container can be migrated with minimal data loss.

6. The computing apparatus of claim 5, wherein the second logic is further configured to migrate the second container.

7. The computing apparatus of claim 1, further comprising an operating system, further configured to perform a core dump of the first container.

8. The computing apparatus of claim 7, wherein the operating system is configured to receive machine check architecture (MCA) logging information from the processor.

9. The computing apparatus of claim 7, wherein the second logic is further configured to notify the operating system of the degraded state of the apparatus.

10. The computing apparatus of claim 1, wherein the second logic further comprises a configuration interface configured to receive configuration options.

11. One or more tangible, non-transitory computer-readable mediums having stored thereon instructions for providing logic to:
   provide a system management interrupt (SMI) handler;
   provide a first container and a second container;
   detect an uncorrectable system-level error caused by the first container, wherein the uncorrectable system-level error affects the first container and the second container;
   responsive to the detecting, generate a degraded system state;
   provide a degraded state message to the SMI handler;
   instruct the second container to seek a recoverable state;
   determine that the second container has entered a recoverable state; and
   after verifying that the second container has entered the recoverable state, initiate a recovery operation.

12. The one or more tangible, non-transitory computer-readable mediums of claim 11, wherein the logic is further configured to set a timeout, and to initiate the recovery operation after expiration of the timeout.

13. The one or more tangible, non-transitory computer-readable mediums of claim 11, wherein the logic is further to provide degradation notification to a controller via a fabric interface.

14. The one or more tangible, non-transitory computer-readable mediums of claim 13, wherein the logic is further to request the controller to spawn a new instance of a service provided by the first container.

15. The one or more tangible, non-transitory computer-readable mediums of claim 11, wherein the recoverable state comprises a state in which the second container can be migrated with minimal data loss.

16. The one or more tangible, non-transitory computer-readable mediums of claim 15, wherein the logic is further configured to migrate the second container.

17. The one or more tangible, non-transitory computer-readable mediums of claim 11, wherein the logic is further configured to provide an operating system configured to perform a core dump of the first container.

18. The one or more tangible, non-transitory computer-readable mediums of claim 17, wherein the operating system is configured to receive machine check architecture (MCA) logging information from the logic.

19. The one or more tangible, non-transitory computer-readable mediums of claim 17, wherein the logic is further configured to notify the operating system of the degraded state of the first container.

20. The one or more tangible, non-transitory computer-readable mediums of claim 11, wherein the logic further comprises a configuration interface configured to receive configuration options.

21. A computer-implemented method of providing delayed error processing, comprising:
   providing a system management interrupt (SMI) handler;
   providing a first container and a second container;
   detecting an uncorrectable system-level error caused by the first container, wherein the uncorrectable system-level error affects the first container and the second container;
   responsive to the detecting, generating a degraded system state;
   providing a degraded state message to the SMI handler;
   instructing the second container to seek a recoverable state;
   determining that the second container has entered a recoverable state; and
   after verifying that the second container has entered the recoverable state, initiating a recovery operation.

22. The method of claim 21, further comprising setting a timeout, and to initiate the recovery operation after expiration of the timeout.

23. The method of claim 21, further comprising providing degradation notification to a controller via a fabric interface.

24. The method of claim 23, further comprising requesting the controller to spawn a new instance of a service provided by the first container.

25. The method of claim 21, wherein the recoverable state comprises a state in which the second container can be migrated with minimal data loss.

* * * * *